United States Patent [19]

Osswald et al.

[11] 3,954,495

[45] May 4, 1976

[54] PROCESS FOR THE PRODUCTION OF PIGMENTS USEFUL FOR WAXLESS CARBON PAPER

[75] Inventors: Günter Osswald, Hanau; Hans Gräf, Rodenbach, both of Germany

[73] Assignee: Deutsche Gold- und Silber-Scheideanstalt vormals Roessler, Germany

[22] Filed: Feb. 28, 1975

[21] Appl. No.: 554,221

[30] Foreign Application Priority Data

Mar. 8, 1974 Germany............................ 2411104

[52] U.S. Cl............................ 106/307; 106/308 N; 106/308 Q; 428/411; 260/42.16; 260/29.6 HN; 260/34.2; 260/42.54
[51] Int. Cl.².......................................... C09C 1/48
[58] Field of Search............... 106/307, 304, 308 N, 106/308 M; 260/37 N, 42.16, 42.54, 34.2, 29.6 HN

[56] References Cited

UNITED STATES PATENTS

| | | | |
|---|---|---|---|
| 3,088,837 | 5/1963 | Prescott et al. | 106/308 N |
| 3,749,670 | 7/1973 | Ormsbee et al. | 260/34.2 |
| 3,904,562 | 9/1975 | Hopfenberg | 106/308 M |

*Primary Examiner*—Winston A. Douglas
*Assistant Examiner*—J. V. Howard
*Attorney, Agent, or Firm*—Cushman, Darby & Cushman

[57] ABSTRACT

Pigment preparations containing carbon black, blue pigment and a wetting agent are prepared having an intimate inseparable mixture based on the total amount of pigment of 60–95 wt. % carbon black pigment and 40 to 5 wt. % blue pigment and based on 100 parts by weight of pigment, 0.5 to 3 parts weight of polyvinylpyrrolidone and 4 to 10 parts by weight of a cation active invert soap. The products are useful for pigmenting waxless carbon papers, typewriter tapes, printing inks and synthetic resins.

22 Claims, No Drawings

PROCESS FOR THE PRODUCTION OF PIGMENTS USEFUL FOR WAXLESS CARBON PAPER

The invention is directed to a process for the production of pigment preparations including carbon black and blue pigments in addition to a wetting agent which are especially suitable for the pigmentation of waxless carbon papers as well as typewriter tapes, printing inks and synthetic resins.

It is known in the pigmentation, for example of waxless carbon papers to separately work into a coating composition carbon black and blue pigments (Berlin blue, Fanal violet, Reflex blue and related compounds) as well as a wetting agent or to use pigment preparations which contain a combination of carbon black, blue pigment and wetting agent. The use of such pigment preparations has the advantage that because of the reduced oil demand of the preparation there is obtained a better flowing coating composition for the carbon paper and a sharper carbon copy image of the carbon paper is producible.

Previously known pigment preparations were produced by the use of expensive apparatus and time consuming procedures. Thus one process provides the following operation. The carbon black which is produced in dry form is suspended in an aqueous solution of soluble dyestuff. With the help of a laking agent then the dyestuff is made fast to the carbon black. Subsequently the suspension is treated with an anion active wetting agent. After intensive stirring there is added a cation active wetting agent. Thereupon the preparation flocculates. The product is filtered off in filter presses and subsequently dried. Through the high drying temperatures of 90°–100°C. which are necessary to dry the water wet material there exists the danger that the wetting agent components are again partially decomposed. The invention provides a simplified and economical process for the production of pigment preparations containing carbon black and blue pigments in addition to wetting agents, which pigment preparations are especially suitable for pigmentation of waxless carbon papers and also for coloring typewriter tapes, printing inks and synthetic resins. The process comprises intimately mixing carbon black and blue pigments with powdery or dissolved polyvinylpyrrolidone and a solution of a cation active invert soap in an organic solvent and drying the mixture at temperatures below 80°C., e.g., as low as 20°C.

The invention is based on the idea of linking together the two pigments, carbon black and the blue pigment (for example Berlin blue, Fanal violet, Reflex blue and other conventional blue pigments, e.g., those employed in carbon papers and typewriter ribbons) with the aid of polyvinylpyrrolidone so that the resistance to bleeding (the dissolving of the blue from the carbon black by organic solvents) is clearly improved and the inclusion of a cation active invert soap there is improved the wettability and dispersibility.

In contract to the previous procedure for using wetting agents which provides for the successive addition of cationic and anionic wetting agents the use of the type of wetting agent proposed in the invention has the advantage that there need only be employed a single operation for working it into the pigment preparative. The cation active invert soap is added dissolved in an organic solvent.

The process of the invention can be practiced by either (1) intensively mixing either carbon black pigment, blue pigment and polyvinylpyrrolidone powder by triturating action and/or grinding and/or shearing power and then work in a solution of the cation active invert soap, preferably in an alcohol or carboxylic acid ester, or (2) by intensively mixing carbon black pigment and blue pigment by triturating action and/or grinding and/or shearing power and then working in a solution of polyvinylpyrrolidone and cation active invert soap, preferably in an alcohol or a carboxylic acid ester, e.g., an alkyl alkanoate.

The triturating action and/or grinding and/or shearing power for the intensive mixing of the individual pigments is carried out suitably according to the invention in specially chosen machines. As especially suited there have been found mixing in a pug mill, in a kneader or in intensive or liquid mixers. However, the preparative can also be produced in a bead drum or in a Henschel mixer.

It has been found that an especially good dispersibility of the preparatives of the invention is obtained in the subsequent treatment if there is used as wetting agent a cation active inert soap in the form of dioleate salts of long chain fat diamines having 10 to 18 carbon atoms. There can be used individual fatty diamines or mixtures of fatty diamines. The proportions by weight between the pigments are suitably so adjusted that based on the total amount of pigment there are employed 60–95 wt. % carbon pigment and 40 to 5 wt. % blue pigment.

Pigment preparation of this composition show suitable color properties as tint, color strength and depth of color for the intended purpose of use. It has further been found especially favorable for maintaining the state of distribution produced by the mixing – as well as the non-separability of the components in commercially capable preparation and for the production of an easy dispersibility in the compositions, pastes, printing ink inserts and synthetic resins or synthetic resin mixtures — to add 0.5 to 3 parts by weight of polyvinylpyrrolidone and 4 to 10 parts by weight of cation active invert soap, in each case based on 100 parts by weight of the amount of pigment. This is always present as a solid additive, insofar as there is used the method of working the pigment preparation in a solution of polyvinyl pyrrolidone and invert soap best in the form of a solution working in between 10 and 44 wt. % of the solution provided in isopropanol, ethanol or ethyl acetate or mixtures of these solvents containing 10 to 44% total solids content, the pigment being worked into the solution.

If there is used the method in which the solution of the invert soap is worked into a mixture of pigment and polyvinyl pyrrolidone the cation active invert soap is worked into the pigment polyvinyl pyrrolidone mixture, preferably as an 11 to 45 wt. % solution in ethanol, isopropanol or ethyl acetate or their mixtures.

Other solvents which can be employed include for example alkanols such as methanol, propanol, butanol, isobutanol and alkyl alkanoates such as methyl acetate, propyl acetate, butyl acetate, amyl acetate, ethyl propionate, methyl butyrate, etc.

Subsequently the solvent is drawn off and the residue carefully dried. Suitable temperatures of drying are preferably in the range of 70° to 80°C. but this can be varied. Drying can also be carried out under a vacuum.

In such case room temperature (e.g. 20°C.) is sufficient and is preferred.

A further object of the invention is to prepare a pigment preparation containing carbon black and blue pigments and a wetting agent which comprises an intimate, non-separable mixture based on the total amount of pigment of 60 to 95 wt. % of carbon black pigment and 40 to 5 wt. % of blue pigment and based on 100 parts by weight of the pigment 0.5 to 3 parts by weight of polyvinyl pyrrolidone and 4 to 10 parts by weight of cation active invert soaps, especially a dioleate salt of a long chain fatty diamine with 10 to 18 carbon atoms, e.g., diamine of capric acid, lauric acid, myristic acid, palmitic acid, stearic acid, oleic acid, linoleic acid or mixtures of such diamines, e.g., by using diamines made from drying or non-drying oils.

Further invert soaps usable in the invention are quarternary ammonium salts such as cetyl trimethyl ammonium chloride, stearyl trimethyl ammonium bromide, cetyl pyridinium chloride and cetyl benzyl dimethyl ammonium chloride.

The invention extends further to the special pigment preparations obtainable according to the described process conditions and to the use of the new type of preparatives and their special embodiments for pigmentation of waxless carbon papers, typewriter tapes, printing inks and synthetic resins, e.g., polyvinyl chloride, polyethylene, polypropylene, etc.

Unless otherwise indicated all parts and percentages are by weight.

The following examples illustrate the invention but are non-limiting.

EXAMPLE 1

(Weight ratio of black/blue = 83:17)

In an edge mill there were milled for 1 hour

| | |
|---|---|
| Gas Black | 77 parts by weight |
| Berlin blue | 8 parts by weight |
| Alkali blue (C.I. 704) | 8 parts by weight |
| Polyvinyl pyrrolidone | 1 part by weight |

Then there were dropped in 6 parts by weight of tall oil acids diamine dioleate dissolved in 25 parts of ethanol. After a total grinding time of 2 hours the product was dried in a drying cabinet at 70°–80°C.

PIGMENT PROPERTIES

The product in esters, ketones and chlorinated hydrocarbons only showed a tendency of the dyestuff to bleed in very small amounts. This trace of bleeding is not measurable.

Through the low oil demand of the preparation there is obtained very good flowing pastes in different binders (alkyd resins, oil mixtures). By the linking of the carbon black with blue pigments there is produced a bluer undertone, which makes superfluous a toning up of the pigment.

EXAMPLE 2

(Weight ratio black/blue = 65:35)

There were mixed in a kneader for 1 hour

| | |
|---|---|
| Furnace black | 60 parts by weight |
| Berlin blue | 17 parts by weight |
| Reflex blue | 16 parts by weight |
| Polyvinyl pyrrolidone | 1 part by weight |

Subsequently there were dropped in 6 parts by weight of oleic acid diamine dioleate dissolved in 25 parts by weight of ethyl acetate. After a total of 2 hours of kneading the preparation was dried in a drying chest at about 80°C.

PROPERTIES OF PREPARATION

Through the greater portion of blue employed there was produced a stronger blue cast. The other properties were the same as in Example 1.

EXAMPLE 3

(Weight ratio carbon black/blue = 95.5)

There was mixed in an intensive mixer for three-fourths hour

| | |
|---|---|
| Carbon black | 88.5 parts by weight |
| Fanal violet | 4.5 parts by weight |
| Polyvinyl pyrrolidone | 1.0 part by weight |

Subsequently there were added to the mixture 6 parts of fatty acid diamine dioleate (the diamine being essentially a mixture of 16–18 carbon atom diamines) dissolved in 25 parts by weight of ethanol. After 2 hours the product was dried (70°–80°C.).

PROPERTIES OF PREPARATION

The blue cast is not as great as in Example 2. Besides the flow properties of the preparation are somewhat poorer than those described in Example 2.

EXAMPLE 4

(0.5 parts by weight PVP to 100 parts by weight of pigment).

There were ground for 1 hour

| | |
|---|---|
| Gas black | 77.0 parts by weight |
| Milori blue | 8.0 parts by weight |
| Reflex blue | 8.0 parts by weight |

Subsequently there were dropped into the mixture of pigments polyvinyl pyrrolidone 0.47 parts by weight and fatty acid diamine dioleate (the diamine being essentially a mixture of 16–18 carbon atom diamines) 6.0 parts by weight dissolved in ethanol 58.8 parts by weight.

After a total reaction time of 2 hours the substance was dried at 70°–80°C. in a dry aggregate.

There was obtained a preparation that showed the same properties were produced as in Example 1.

EXAMPLE 5

(3 parts by weight PVP to 100 parts of pigments)

| | |
|---|---|
| Gas black | 77.0 parts by weight |
| Milori blue | 8.0 parts by weight |
| Reflex blue | 8.0 parts by weight | were dry ground for 1 hour and there were added thereto 2.8 parts by weight of polyvinyl pyrrolidone and 6.0 parts of long chain fatty acid diamine dioleate (the diamine consisting essentially of a mixture of 16–18 carbon atom diamines) dissolved in 11.2 parts by weight of isopropanol. After a total reaction time of 2 hours the product was dried in a drying cabinet at 70°–80°C. The properties of the preparative were the same as in Example 1.

EXAMPLE 6

(4 parts by weight fatty acid diamine oleate to 100 parts by weight of pigment)

| | |
|---|---|
| Gas black | 77 parts by weight |
| Milori blue | 8 parts by weight |
| Reflex blue | 8 parts by weight |

After 1 hour grinding in a pug mill there were added to this mixture 1.00 parts by weight of polyvinyl pyrrolidone and 3.72 parts by weight of the same fatty acid diamine dioleate as in Example 5 dissolved in 10.00 parts by weight of ethyl acetate. In all the reaction was continued for 2 hours. Then the preparation was dried at 70°–80°C. The properties of the preparative were the same as in Example 1.

EXAMPLE 7

(10 parts by weight of fatty acid diamine oleate to 100 parts by weight of pigment)

| | |
|---|---|
| Gas black | 77 parts by weight |
| Milori blue | 8 parts by weight |
| Reflex blue | 8 parts by weight |

This mixture was first ground for 1 hour in a pug mill. Subsequently there were added thereto 1.0 parts by weight of polyvinyl pyrrolidone and 9.4 parts by weight of the same fatty acid diamine dioleate as in Example 5 dissolved in 40.0 parts by weight of isopropanol. Total reaction time: 2 hours; drying was carried out at 70°–80°C. The properties of the preparative were the same as in Example 1.

The organic solvent should be inert and not dissolve the carbon black or the blue pigment. The process can comprise, consist essentially of or consist of the steps set forth and the composition likewise can comprise, consist essentially of or consist of the materials set forth.

We claim:

1. A process for the production of a pigment composition containing both carbon black and a blue pigment and a wetting agent comprising intensively mixing said carbon black and blue pigment with polyvinyl pyrrolidone and a solution of a cation active invert soap in an organic solvent and then drying the mixture.

2. The process of claim 1 wherein the drying is a temperature of not over 80°C.

3. The process of claim 2 wherein the polyvinyl pyrrolidone is added as a powder.

4. The process of claim 2 wherein the polyvinyl pyrrolidone is added dissolved in a solvent.

5. The process of claim 4 wherein the carbon black and blue pigment are first intensively mixed together and then the polyvinyl pyrrolidone and cation active invert soap are added in an organic solvent.

6. The process of claim 5 wherein the intensive mixing of the carbon black and blue pigment comprises a triturating step.

7. The process of claim 5 wherein the intensive mixing of the carbon black and blue pigment comprises a grinding step.

8. The process of claim 5 wherein the intensive mixing of the carbon black and blue pigment comprises a shearing action.

9. The process of claim 5 wherein the solvent is an alcohol or an ester of a carboxylic acid.

10. The process of claim 5 wherein the cation active invert soap is a dioleate salt of a long chain fatty diamine having 10 to 18 carbon atoms.

11. The process of claim 10 wherein the pigment consists of 60 to 95% carbon black pigment and 40 to 5% blue pigment.

12. The process of claim 11 wherein based on 100 parts of pigment there are used 0.5 to 3 parts of polyvinyl pyrrolidone and 4 to 10 parts of cation active invert soap.

13. The process of claim 12 wherein (a) the polyvinyl pyrrolidone and (b) the cation active invert soap are employed as a 10 to 44% solution of (a) and (b) in a solvent selected from the group consisting of ethanol, isopropanol and ethyl acetate and mixtures thereof and this solution is worked into the mixture of pigments.

14. The process of claim 12 wherein the cation active invert soap is employed as an 11 to 45% solution in a solvent selected from the group consisting of ethanol, isopropanol and ethyl acetate and mixtures thereof and this solution is worked into a mixture of carbon black and blue pigments and polyvinyl pyrrolidone.

15. The process of claim 5 wherein the pigment consists of 60 to 95% carbon black pigment and 40 to 5% blue pigment.

16. The process of claim 15 wherein based on 100 parts of pigment there are used 0.5 to 3 parts of polyvinyl pyrrolidone and 4 to 10 parts of cation active invert soap.

17. The process of claim 16 wherein the drying is carried out at room temperature in a vacuum.

18. The process of claim 16 wherein the drying is carried out at 70°–80°C.

19. A pigment preparation containing an intimate non-separable mixture of 60–95% carbon black pigment and 40–5% of blue pigment based on the total pigment and based on 100 parts of the total of said pigments 0.5 to 3 parts of polyvinyl pyrrolidone and 4 to 10 parts of a cation active invert soap.

20. A pigment preparation according to claim 19 wherein the invert soap is a dioleate of a long chain fatty diamine having 10 to 18 carbon atoms.

21. A pigment preparation according to claim 20 wherein the long chain fatty diamine is the diamine derived from tall oil acids.

22. A pigment preparation according to claim 20 wherein the long chain fatty diamine is the diamine derived from oleic acid.

* * * * *